(12) United States Patent
Harrington

(10) Patent No.: US 6,179,485 B1
(45) Date of Patent: Jan. 30, 2001

(54) PRINTING BLACK AND WHITE REPRODUCIBLE COLORED STROKE DOCUMENTS

(75) Inventor: Steven J. Harrington, Webster, NY (US)

(73) Assignee: Xerox Corporation, Stamford, CT (US)

(*) Notice: Under 35 U.S.C. 154(b), the term of this patent shall be extended for 0 days.

(21) Appl. No.: 08/752,190

(22) Filed: Nov. 18, 1996

(51) Int. Cl.⁷ .............................. G06K 9/36; G06K 15/00; H04N 1/56; H04N 1/23

(52) U.S. Cl. ................. 395/109; 395/110; 382/162; 358/501; 358/530; 358/401

(58) Field of Search ..................... 395/109, 110; 382/162, 165, 176, 200, 254, 259; 358/500, 501, 530, 401, 296

(56) References Cited

U.S. PATENT DOCUMENTS

| | | |
|---|---|---|
| 3,807,852 | 4/1974 | Hoydic . |
| 4,308,551 | 12/1981 | Roetling . |
| 4,703,318 | 10/1987 | Haggerty . |
| 5,098,817 | 3/1992 | Voorhees . |
| 5,138,465 | 8/1992 | Ng et al. . |
| 5,142,337 | 8/1992 | Kardis et al. . |
| 5,153,576 | 10/1992 | Harrington . |
| 5,153,739 | 10/1992 | Laman et al. ................ 358/300 |
| 5,291,243 | 3/1994 | Heckman et al. . |
| 5,321,470 | 6/1994 | Hasuo et al. . |
| 5,557,430 | * 9/1996 | Isemura et al. ............... 358/501 |
| 5,568,248 | 10/1996 | Wagley . |
| 5,691,827 | * 11/1997 | Kamei et al. ................. 358/530 |
| 5,701,401 | * 12/1997 | Harrington et al. ........... 395/109 |
| 5,726,781 | * 3/1998 | Isemura et al. ............... 358/530 |

* cited by examiner

Primary Examiner—Scott Rogers
(74) Attorney, Agent, or Firm—Mark Costello

(57) ABSTRACT

A document containing colored strokes or lines is reproduced in a way to preserve the color intent if the reproduced document is copied on a black-and-white device. Dashed lines are generated for insertion into the stroke, with dashing patterns that reflect the original color of the stroke. Outlining in black or white, dependent on the stroke color, may be provided. If the stroke is wide enough, the color within the stroke may alternatively be reproduced with a black and white reproducible pattern.

18 Claims, 7 Drawing Sheets

PRINTING BLACK AND WHITE REPRODUCIBLE COLORED STROKE DOCUMENTS

FIELD OF THE INVENTION

The present invention relates to a method and apparatus for printing color documents in such a manner that when the color documents are reproduced on a black and white copier or printer, their color information content is retained.

CROSS REFERENCE AND INCORPORATION BY REFERENCE

Cross reference is made to co-pending U.S. patent application Ser. No. 08/720,654, now U.S. Pat. No. 5,701,401,by S. Harrington and J. Taber, entitled, "Printing Black and White Reproducible Documents", which is also incorporated by reference for its teachings.

COPYRIGHT NOTICE

A portion of the disclosure of this patent document contains material which is subject to copyright protection, The copyright owner has no objection to the facsimile reproduction by anyone of the patent document or the patent disclosure, as it appears in the Patent and Trademark Office patent file or record, but otherwise reserves all copyright rights whatsoever.

BACKGROUND OF THE INVENTION

Color printers and copiers usually operate in work environments that still include black and white devices. While color printing has become increasingly common in the workplace, the cost of color printing still remains substantially above that of black and white printing. Thus, while color documents can be readily created for small volume use, large volume reproduction suggests that black and white printers or copiers should be used.

When a color document is copied to black and white, the information conveyed by the color can be lost. Information is often conveyed by color through the use of distinct colors representing distinct information. When color documents are copied on a black and white copier, or faxed on a black and white facsimile machine, or reproduced from a color file to a black and white print, information may be lost. These devices usually threshold the luminance component of the source image to represent the image in either black or white, raising the problem of translating the intermediate luminance of colored objects on a page. Many darker colors often copy as black, while lighter colors drop out completely. When gray tones are reproduced, they are often mottled or ragged. Ironically, increases in printer resolution and halftone frequency that improve color image quality act to exacerbate the copy problem. Increases in printer resolution make the image appear to the copier as well as to the human observer as smooth areas of intermediate luminance rather than a pattern of halftone dots.

Even if a copier could reproduce the luminance level of source colors reliably, many different colors have the same luminance and are therefore indistinguishable after copying. This may not be a severe problem for pictorial images where much of the information is in the luminance component, but for text or presentation graphics, color offers new dimensions for conveying information. Color can be used to organize important items, distinguish categories, and organize documents and document content. However, when copied or faxed to black and white, the distinguishing capability of color is lost.

The primary goals of most documents is to convey information. If one can anticipate that the document will be copied or faxed with a black-and-white reproduction device, and information might therefore, be lost, it might be desirable to sacrifice some of the appearance of the original document for the sake of information content. One might, for example, decide not to use color at all. Alternatively, a selection may be made to use only color and color features that can be copied well. Such choices are significant barriers in document creation.

It is known that selected background and/or alphanumeric text areas may be printed in repeating and/or varying patterns of highlight color and interposed with black repeating or varying patterns as disclosed, for example, for single pass xerographic printing of composite image security documents in U.S. Pat. No. 5,291,243 to Heckman et al. Some of such color patterns might also reproduce when such documents are copied on a black and white copier, however, such copying is not reliable.

Of further background interest are U.S. Pat. No. 5,308,553 to Roetling and U.S. Pat. No. 5,153,576 to Harrington. These patents, however, electronically convert a full color document into a monochrome facsimile for subsequent monochrome printing by electronically converting pixel by pixel the original solid colors into various different patterns of black only images. Such an arrangement, by definition, does not produce originals, which are reproduced in color, for subsequent copying on a black and white copier which retains the informational content of the original color image. Further, the patterns that these methods produce are limited either to a fixed set, or to designs directly controlled by only the three color components and where areas controlled by the different color components do not overlap.

Other patents of interest include U.S. Pat. No. 4,703,318 to Haggerty, which illustrates the idea of forming a character based monochromatic image from a digital representation of a color image by: (1) forming a character based representation of the color image in which a plurality of color characters each describe the background or foreground color within a defined area of the color image; (2) providing a plurality of color pattern masks each corresponding to a color in the color image comprising a pattern of light and dark dots capable of providing in the monochromatic image visual discrimination between areas of different color; (3) transforming the color characters into monochromatic characters by replacing the background and foreground colors of each color character in the corresponding pattern of light and dark dots; and (4) displaying the monochromatic characters on a character based output device. The present invention differs from Haggerty in that the goal is to produce a printed image in which is copyable, and in which colors and shades of colors can be reproduced to maintain the informational content of the original document which used those colors.

U.S. Pat. No. 3,807,852 to Hoydic illustrates an arrangement in which color is used to identify particular identified areas for copying on a black and white copier.

U.S. Pat. No. 5,321,470 to Hasuo et al relates to an arrangement which uses color and the processes of a color copier to prevent forgery of color documents by improper copying.

U.S. Pat. No. 5,138,465 to Ng et al relates to an apparatus and method for producing selectively edited reproductions of the original document in which alphanumeric character codes written using highlighted color arrangements designated treatment to be applied to a particular document.

U.S. Pat. No. 5,153,739 to Laman et al the use of different fonts corresponding to different colors. In such an arrangement, the difference in the font itself provides distinction between different colors which copied in black and white.

U.S. Pat. No. 5,098,817 to Voorhees teaches highlighting of text in a manner which will reproduce when electronically copied. This is accomplished by applying a tone to only that area of the document to be highlighted and so that the tone remains in place during copying. The tone is sufficiently dark so as to highlight text but light enough so that the text is readable.

U.S. Pat. No. 5,142,337 to Karidis et al teaches an arrangement for reproducing gray levels in place of colors in a two color printer.

U.S. Pat. No. 5,568,248 to Wagley teaches that a pattern can be substituted for a color in a document reproduction.

The above-identified references are incorporated herein by reference for their teachings.

SUMMARY OF THE INVENTION

The present invention is directed to a method and apparatus for producing a varying pattern in colors which allows the use of color in the creation of a color original, and will retain distinguishing color content when the color original is copied in black and white.

Merely using patterns to make colors reproduce in a distinguishable form when copied to black-and-white will not work for strokes (unless the strokes are quite large) because the coarse pattern will interfere with the fine structure of the strokes. The result would appear ragged or dashed or might vanish completely. A technique is described for printing colored strokes in such a way that they can be copied and still remain distinguishable in black-and-white.

These and other aspects of the invention will become apparent from the following description used to illustrate a preferred embodiment of the invention and read in conjunction with the accompanying drawings in which.

Initially, the principles of the invention will be discussed before describing an embodiment of the invention. In accordance with the invention, a method to allow black and white friendly copying, is to impose a pattern in the colors in graphic strokes within an image, where the pattern has a distinctive appearance in the luminance component of the image. The idea is that upon copying, the pattern remains even though the color is lost. Thus, one can tell that the stroke had color and even distinguish between, strokes of different colors since they will have different patterns. The motivation is similar to that of the above-cited Roetling and Harrington patents, which map colors to black-and-white textures that can then be copied. The method described here differs, however, in that it produces colored stroke patterns that use original colors in the original color document Thus the original document can use color to display information, and retains its colored look if it, is not copied.

Merely using patterns to make colors reproduce in a distinguishable form when copied to black-and-white will not work for strokes (unless the strokes are quite large) because the coarse pattern will interfere with the fine structure of the strokes. The result would appear ragged or dashed or might vanish completely. Described is a technique for printing colored strokes in such a way that they can be copied and still remain distinguishable in black-and-white. Colored lines are indistinguishable when copied, or printed on a black and white printer The objective is that the copies of the colored lines and strokes to be visible and look different from the black or white ones. In addition, one would like to be able to distinguish strokes of different colors even after reduction to black-and-white.

One way to guarantee that the colored strokes will copy and will look different from black or white cases is to draw them as outlines with light interiors. The problem with using this alone is that it does not provide a means for differentiating colors after copying. In addition, limiting color to boundaries of the stroke may adversely affect the visibility and impact of the color in the original copyable colored image.

Figure 2A:
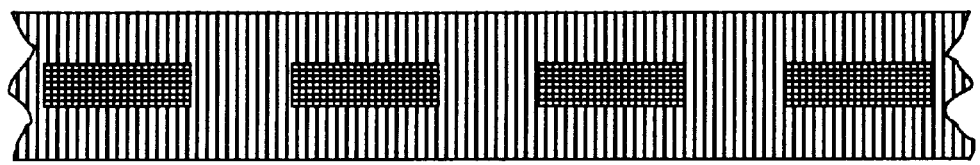
FIGS. 2A and 2B show the appearance of a dashed centerline overlaid on the colored line or stroke.
Figure 2B:

The method proposed here is to include a dash pattern within small and medium width strokes and lines. The interiors of wide strokes may be filled with patterns such as described for solid areas in co-pending U.S. patent application Ser. No. 08/720,654, by S. Harrington and J. Taber. With reference to FIG. 2, a dash pattern of black and/or white dashes can be placed along the center of the stroke and can have a width much smaller than the stroke (for example, a quarter of the original stroke width). This allows the rest of the stroke to be filled with the desired color, thus preserving much of the impact of the color, as seen in FIG. 2. For very thin strokes there will be some limiting width that the printing device is capable of producing. The dash pattern cannot be reduced beyond this width, so for even thinner strokes the colored area beyond the dash pattern will continue to shrink until it encounters the limits of the device. At this point the color will be contributed by only the spaces between the dashes. Of course, other dashed line colors could be used, although white and black are desirable because of their strong contrast in luminance with most colors.

Figure 3:
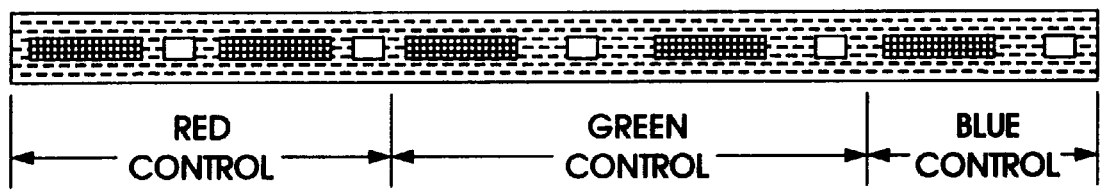
FIG. 3 illustrates the use of dash length and spacing to indicate color.

Referring now to FIG. 3, one would like every color to have a unique dash pattern. Colors can be expressed in terms of red, green, and blue amounts (r, g, b), so every r, g, b coordinate triple should map to a unique dash pattern. The approach is to allow the r, g, and b values to control the length of the dashes. For example, a large b value would generate a long dash, a small value a short dash. The three parameters r, g, and b will each control a distinct and identifiable portion of the pattern.

When colors are copied to black-and-white, some appear black while others become white. If one uses black dashes against a color that copies as black, then they will not be visible. Likewise, white dashes will disappear against colors that copy as white. To overcome this problem, we construct the dash pattern using both black and white dashes. At least one will always be visible. While you could use the same dash lengths for both black and white dashes, it is better to use r, g, b for black dashes and 1-r, 1-g, 1-b to control the lengths of the white (Here r, g, and b are assumed to vary between 0 and 1). There are two advantages in doing this. One is that for light colors you get long black dashes that are easily visible and short white ones, while for dark colors one gets long white dashes that are again easily visible and short black ones. The second advantage is that the black and white dash lengths add up to a constant value so that taken together the frequency of the dash pattern does not change. This means that the length of the overall pattern can be used for any color component as a way of differentiating components from each other. For example, the length of the portion of the pattern contributed by red can be made shorter than the length contributed by green.

The number of dashes can also be used in the portion of the pattern contributed by a color component to distinguish it from other components. A possible pattern structure is shown in FIG. 3, which shows an example line segment with a red control area, a green control area, and a blue control area.

Figure 4:
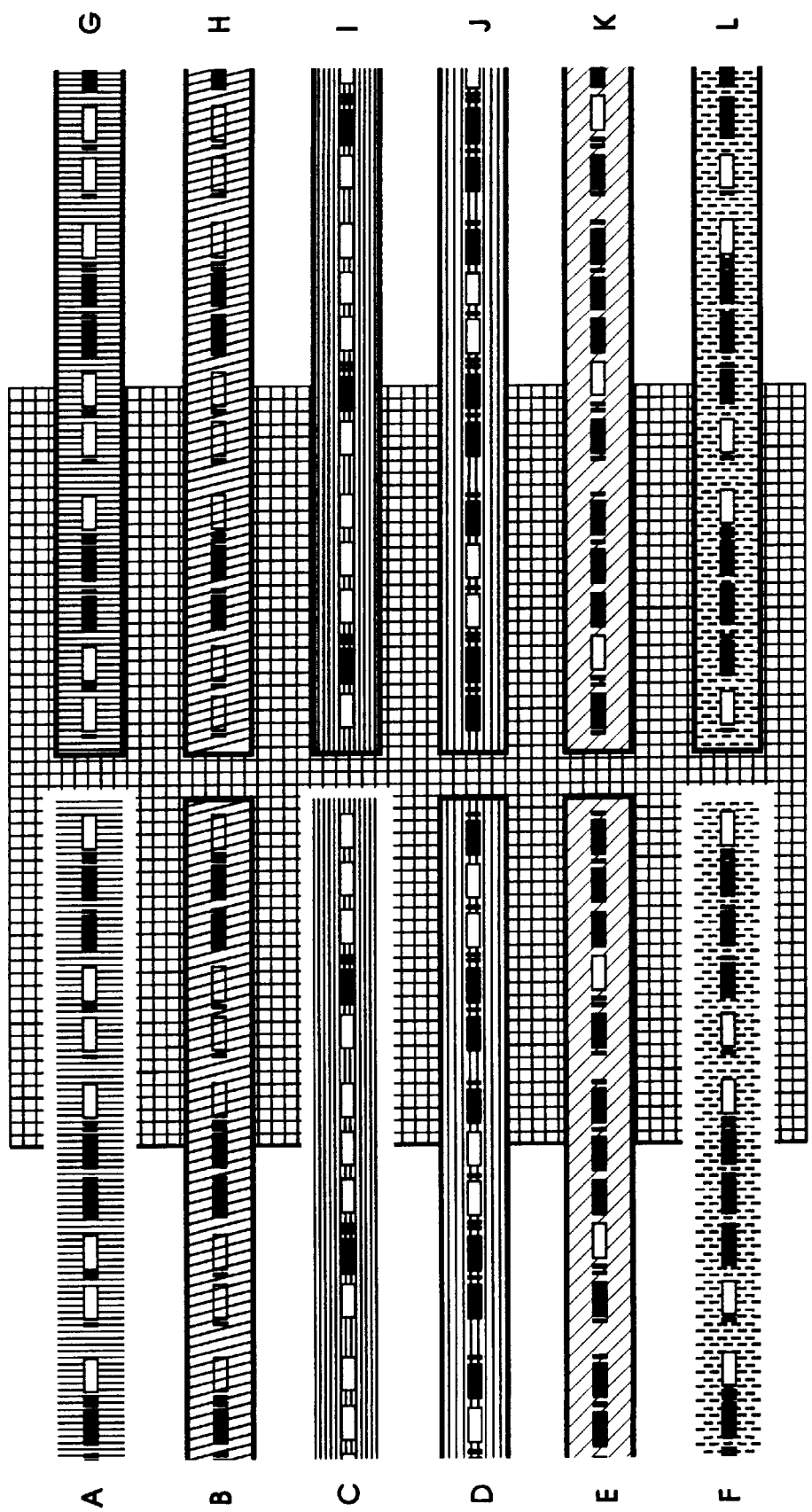
FIG. 4 shows the effect of outlining strokes or lines against ark or light background.

You can outline the stroke as well as place the dash pattern down its center so that the stroke-width will be indicated when copied, even if the color disappears. The outline can be black or white or some combination of the two. When the source image contains dashed strokes, trying to place dashes within dashes may be too much and just result in confusion. Dashed strokes can be drawn using just the outline, or with the outline and a solid black or white contrasting stroke down the center to guarantee copying. The color-dependent central dash pattern should be used only when the original stroke is solid. The effect of this pattern on strokes of various colors is shown in FIG. 4, which shows various strokes, outlines and non-outlined, against a white background and a dark background. Stokes A, C and F have white outlining, while strokes B, D, and E have black outlining. Strokes G–L all have black outlining.

The black-and-white friendly stroke patterns described can be constructed by replacing the original stroke with an overlaid sequence of solid and dashed strokes along the same original center line. The effect of outlining a stroke can be obtained by drawing a stroke with greater width in the outline color beneath the stroke drawn in the interior color. The black and white dash patterns can be created by drawing black dashed strokes and white dashed strokes on top of the colored stroke. Dashes can also be produced by individually placing each black or white dash if the page description does not support a dashed stroke primitive. The substitution of the stroke set producing the patterns for the original stroke can occur either at the PDL level by the print driver or at the raster level by the rasterization software.

A GDI description might be modified to construct the stroke patterns although this would entail individual description of each dash. Modification of the rendering software would most likely provide the most efficient implementation, but it requires control of that software.

Figure 1:
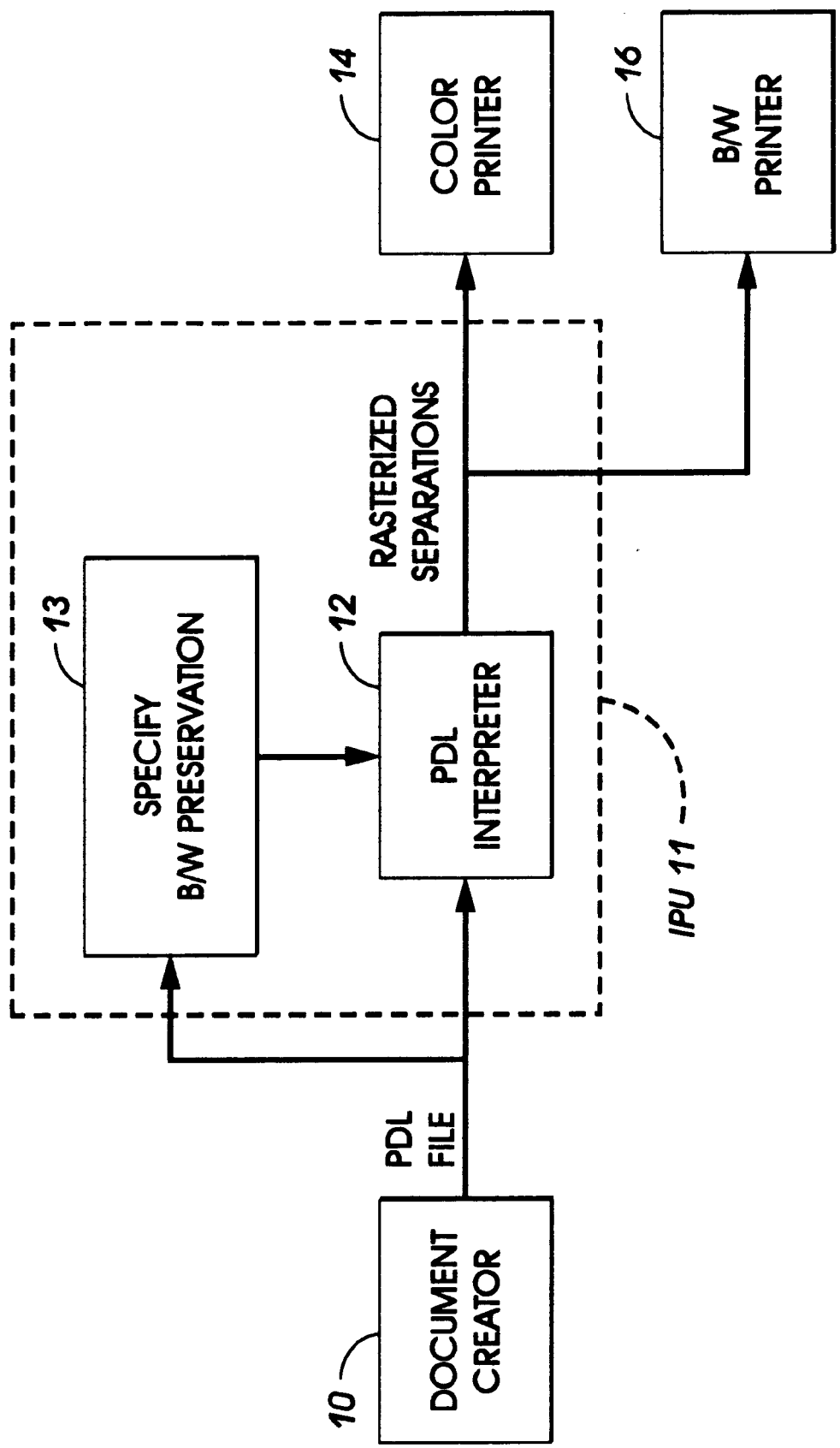
FIG. 1 illustrates a system in which the present invention may find advantageous use.

Turning now to an implementation of the invention, and referring to FIG. 1, a simplistic description of a possible environment for the invention is shown. A document creator 10, perhaps a computer or word processor, generates a file in a PDL or page description language. An image processing unit 11 includes, among other functions, a PDL interpreter 12 and a black and white preservation specification function 13. Determination of whether black and white preservation rendering will be applied occurs within the IPU, at block 13 responsive to the PDL file directed thereto. The PDL is a relatively high level language, which must be interpreted or decomposed to generate a rasterized image for use by a printer. Typically, a decomposer or interpreter 12, which accomplishes this task can be in either a computer attached to a printer, or be combined or combinable with a printer, as a "printer front end" or ESS. Upon generating a rasterized version of the image, the decomposer passed the image to a printer engine for printing. A document is output as a result of the process. The printer in the particular environment shown may be either a color printer 14 or a black and white printer 16. In this environment, an ON/OFF switch is provided, suitably by a user interface command to the application software, to turn ON or OFF the black and white reproducible print option.

Figure 5:
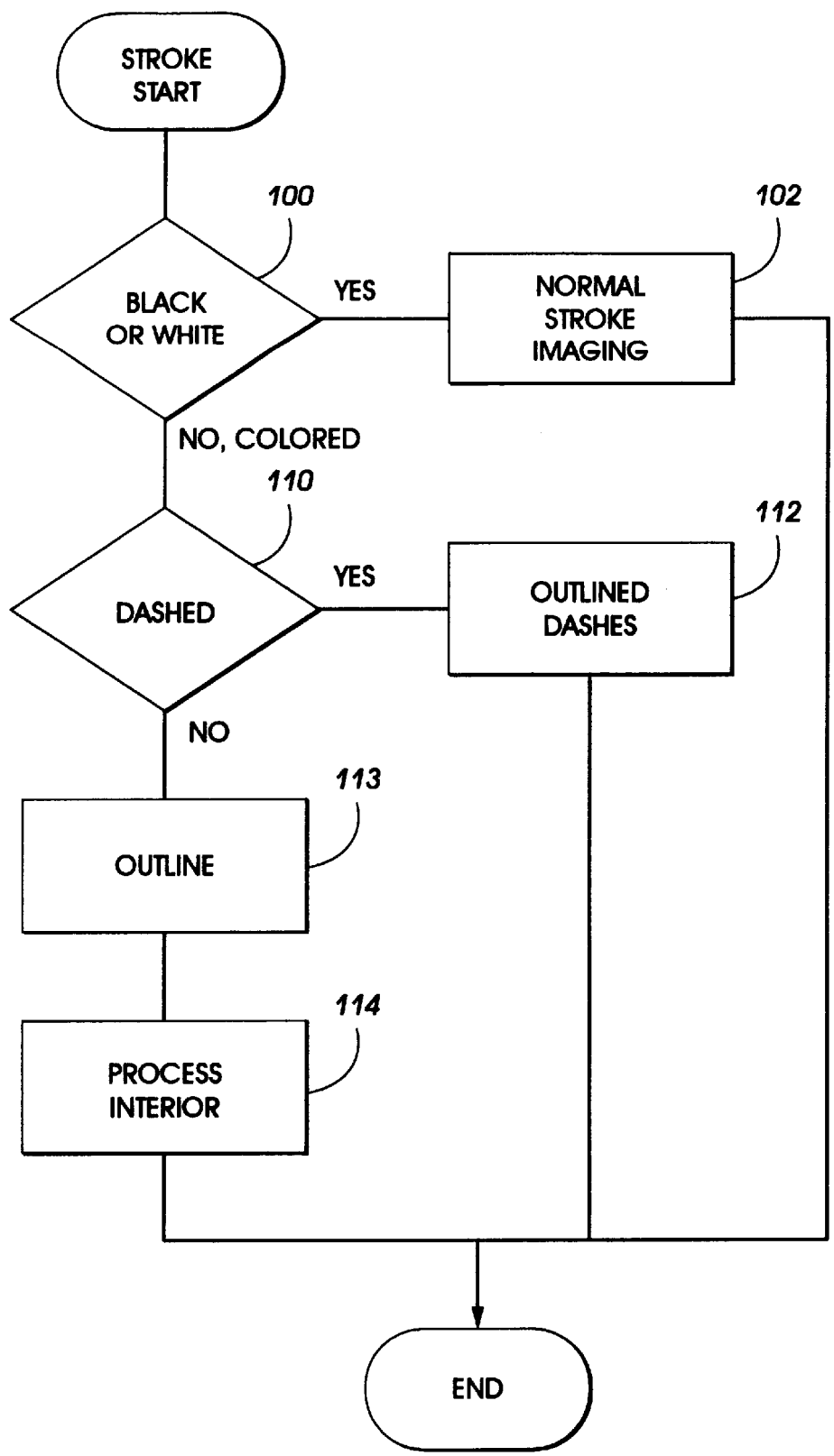
FIGS. 5–8 show a flow chart for a processor-based implementation of the invention.

At FIG. 5, the Stroke module is called by interpreter 12, when required. At step 100, an determination is made as to whether the stroke is black /white or colored. If the stroke is black/white, at step 102 a normal stroke process is used to generate the stroke. If the stroke is colored, at step 110, it is checked to see if it is dashed. If the stroke is dashed, at step 112, the dashed stroke elements are outlined, using module Patdash, better shown at FIG. 6.

Figure 6:
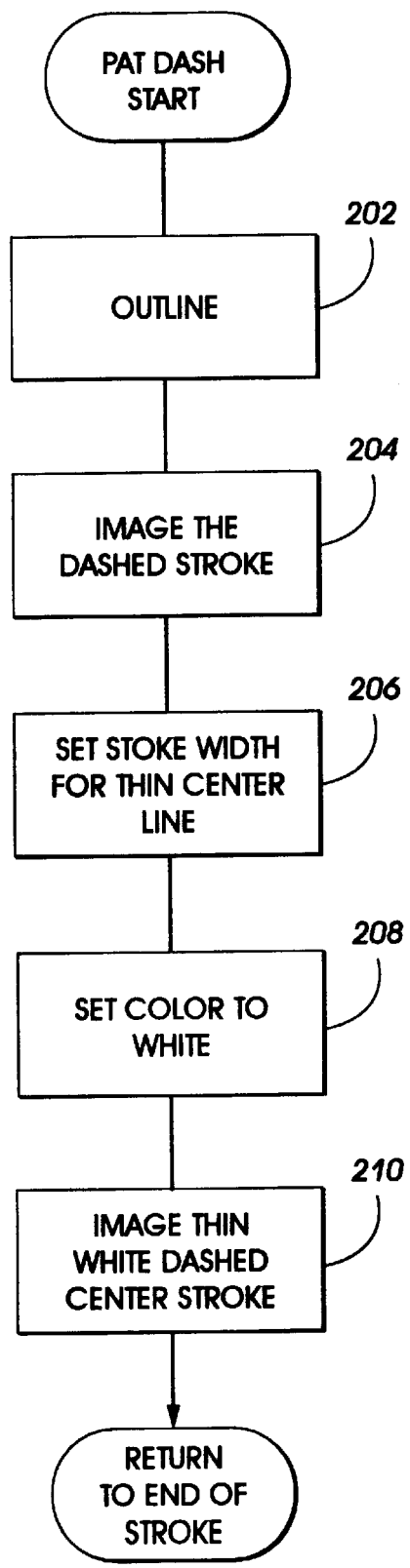

At FIG. 6, module Patdash is illustrated. Initially, the stroke is outlined at step 202. At step 204, the dashed stroke is imaged or rasterized. At step 206, a stroke width for the thin center line is determined. At step 208, the color of the thin center line stroke is set to white. At step 210, the thin center line is imaged or rasterized and combined with the main dashed stroke, and the process returns to module stroke in FIG. 5.

Figure 7:
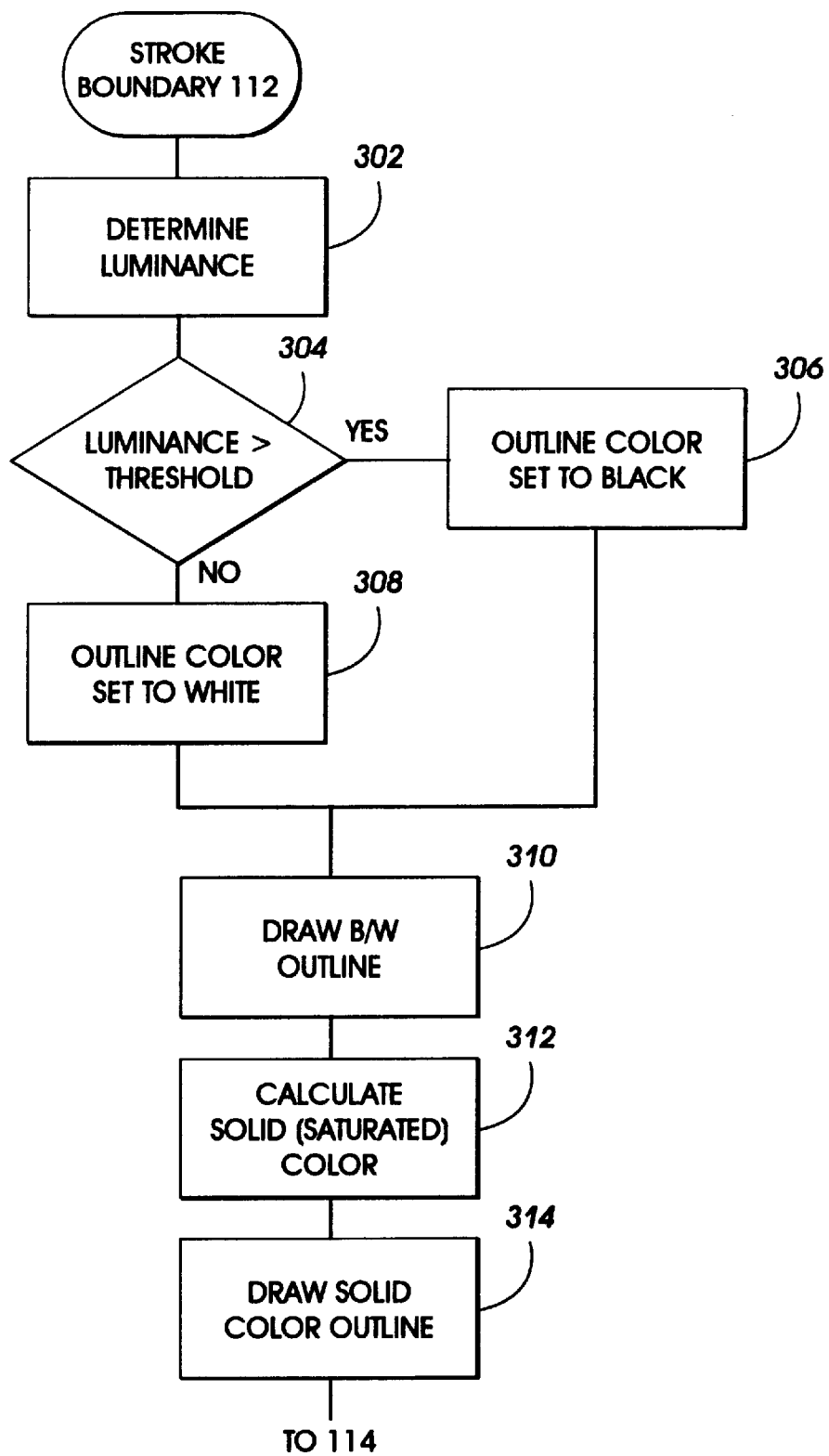

Referring now back to FIG. 5, if at step 110, the stroke is determined not to be dashed, then at step 113, the outline of the stroke, or the stroke boundary, is generated at module Strokeboundary. Referring now to FIG. 7, this process begins with a determination of luminance of the stroke at step 302. At step 304, luminance of the stroke is checked against a preset threshold such as 0.7 on as scale of 0 to 1. Alternatively, on a system that allows examination of the background values, the luminance of the background can be obtained and examined in steps 302 and 304. Depending on whether the luminance exceeds the threshold level, the outline color of the stroke is set either to black (step 306) or white (step 308). Taking into account the determination, the black or white outline is generated at step 310. Next, based on the color of the stroke, a solid saturated color is determined or calculated for the stroke at step 312. With the color now available, a solid color outline is generated for the stroke, at step 314.

Figure 8:
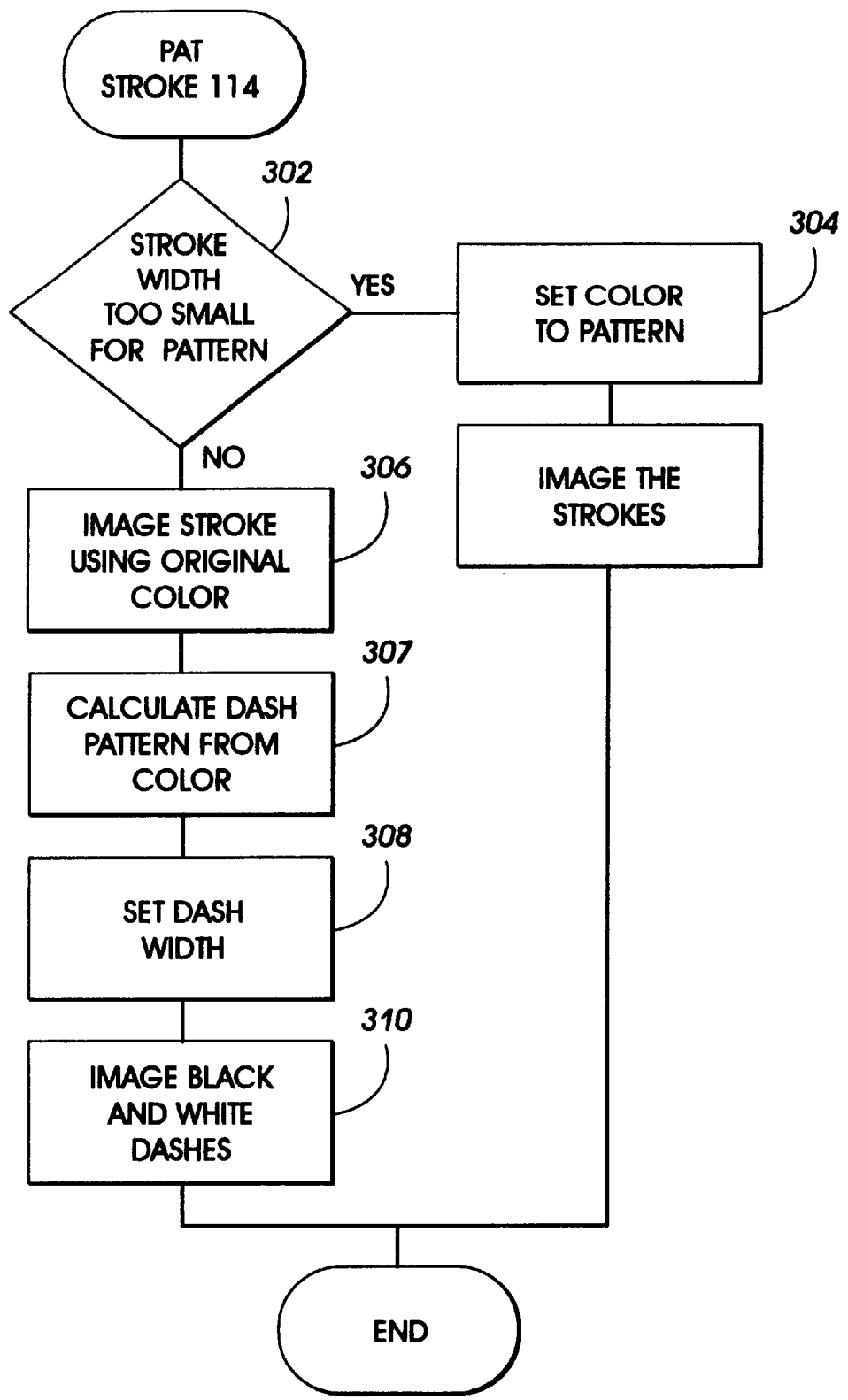

With the outline generated, the interior of the stroke is processed, with the module Patstroke 114, shown in detail at FIG. 8. At step 302, a determination is made initially as to whether the size is too small for a pattern representing the color to be imposed onto the stroke. If the stroke width is an appropriate size for such a pattern, the color of the stroke is set to such a pattern at step 304, and the stroke is imaged with such a pattern. For details of the pattern generation, see U.S. patent application Ser. No. 08/720,654 by S. Harrington and J. Taber, entitled, "Printing Black and White Reproducible Document", which is also incorporated by reference for its teachings.

If, at step 302 the stroke width is too small a value to include a pattern, then the stroke is imaged using the original color of the stroke at step 306. Next, a dash pattern is calculated using the color of the stroke at step 307. At step 308, the dash width is set, as a function of the stroke width. At step 310, the black and white dashed generated, for combination with the original color stroke.

It will no doubt be appreciated that this algorithm can be used for formatting strokes to be printed in color that is highly reproducible in black and white copying, or printed directly in black, in which case, the strokes are still formatted in a manner allowing black and white copying.

The disclosed method may be readily implemented in software using object oriented software development environments that provide portable source code that can be used on a variety of computer or workstation hardware platforms.

Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

```
!
%-------------------------
% BLACK-AND-WHITE FRIENDLY COLOR HEADER
% Copyright Xerox Corporation, 1996. All rights reserved
%-------------------------
% Black-and-White Friendly Color provides rendering of a document so as to preserve
% color information should the document be copied on a black-and-white device.
% It does this by redefining the PostScript rendering operators.
% Thick strokes are imaged by filling with two-dimensional patterns, but often
% strokes and lines may be too thin to support the two-dimensional pattern.
% The strategy, in this circumstance, is to place a
% dash pattern down the center of the stroke. The dash pattern is made from
% both black and white dashes on the colored background. This way at least
% half of the dashes remain visible even if the color becomes solid black or
% white when copied. Black or white edges can also be added to the border of the
% stroke so that a colored stroke drawn on a colored background remains visible
% when copied. Stroke processing is done by redefining the "stroke" operator.
%------
% define some useful parameters
%------
/patterncellsize 3 def    % controls the coarsness of the pattern
/patternstrokewidth 7 def    % size for filling strokes with dashs or patterns
%-----UTILITIES---------
/currentrgbdecodecolor
%------
% This procedure is an alternative to currentrgbcolor that does reasonable things
% when the device independent color spaces are used.
% It's pretty dumb in that it just treats CIABasedABC as if it were RGB
% with no conversions.
% And for CIEBasedA it just duplicates the parameter twice for the RGB values.
% PostScript should do the right thing for the device dependent spaces.
% There is a setrgbcodecolor operator to set values extracted this way
%-----
{ currentcolorspace    % determine what color space we must deal with
0 get           % we get an array with name and parameter, keep the name
dup /CIEBasedABC eq       % dup the name so we dont lose it and see if its ABC
{           % assume rgb in disguise for now
pop currentcolor}      % if so pop the name and get the ABC values
{ dup /CIEBasedA eq        % if not see if its CIEBased A
{           % assume gray linear for now
pop currentcolor    % pop the name and get the A value
dup dup }         % dup twice to get values for r, g and b
{           % anything else use device rgb or black
    pop currentrgbcolor }
ifelse
} ifelse
}bind def
/setrgbcodecolor
%-----
% This procedure is an alternative to setrgbcolor that does reasonable things
% when the device independent color spaces are used.
% It's pretty dumb in that it just treats CIABasedABC as if it were RGB
% with no conversions.
% There is a setrgbcodecolor operator to set values extracted this way
%----
{currentcolorspace    % determine what color space we must deal with
```

-continued

```
0 get            % we get an array with name and parameter, keep the name
/CIEBasedABC eq  % at this time we only support ABC or RGB
{setcolor}
{setrgbcolor}
ifelse
} bind def
%------ STROKE RENDERING -------
/strokeboundary
%-----
% This operator draws a boundary around strokes so that color on color will
% remain visible when copied to black-and-white
% This is done by drawing the stroke in black or white with additional
thickness
% We also draw an edge in a saturated extrapolation of the color
% The regular stroke with then be rendered on top and only the edge will
remain
%-----
{
gsave       % save the graphic state to preserve path, color and width
% first decide if border should be black or white
% if the luminance is lighter than 0.7 we use black, for dark colors we use
white
currentrgbdecodecolor     % get the current color
0.1 mul exch 0.6 mul add exch 0.3 mul add       % calculate its luminance
0.7 gt {0} {1} ifelse     % test for brightness and pick black or white
setgray           % and make it the current color
% now we want to add a little bit to the stroke width
% but to do this we must include current transformation
matrix currentmatrix
matrix defaultmatrix
matrix invertmatrix       % so we remove the default transformation
matrix concatmatrix       % from the current transformation
dup 0 get exch dup 3 get exch dup 1 get exch 4 get     % use the determinant
mul 3 1 roll mul sub abs sqrt 1.5 exch div      % to scale the addition
currentlinewidth add setlinewidth % and add it to the stroke width
true setstrokeadjust
stroke       % we can now draw the black or white background stroke
grestore     % and restore the graphics state including path and color
gsave        % save color and path again
currentrgbdecodecolor % get the current color to calculate a saturated
version
% this next calculation finds the minimum of the r, g, b components
3 copy
2 copy lt { pop } { exch pop } ifelse
2 copy lt { pop } { exch pop } ifelse
1 exch sub        % this is 1-min(r, g, b)
dup 0 gt     % if 1-min is 0 the color is white and we don't what to do the
          % calculation because it would divide by zero
% The calculation basically subtract out the minimum and then rescales
% so that the maximum component is 1
% if minimum is m this is (r-m)/(1-m), (g-m)/(1-m), (b-m)/(1-m)
{ dup 3 2 roll 1 exch sub exch div 1 exch sub 4 1 roll
dup 3 2 roll 1 exch sub exch div 1 exch sub 4 1 roll
exch 1 exch sub exch div 1 exch sub 3 1 roll
setrgbcodecolor    % use this saturated color for stroke edge
}
{pop pop pop pop }   % in the case of white just clear the calculation
ifelse
true setstrokeadjust
stroke       % now actually render the colored edge
grestore     % and restore the color and path
} bind def
/patstroke
%-----
% this operator fills the interior of a stroke
% it uses either a 2-dimensional pattern or a dash pattern
% depending on the stroke thickness
%
{
<<           % dictionary of some variables used in the computation
/dscl 3      % scalr factor for calculating dash lengths from color values
/rlcorpat 0  % dash length parameter for red, (green, blue, cyan, etc)
/glcorpat 0
/blcorpat 0
/clcorpat 0
/mlcorpat 0
/ylcorpat 0
/slcorpat 2      % amount of space between dashes
/thnwcorpat 1 % holds a reduced stroke width
```

-continued

```
/wscale 1     % amount to scale lengths to work in current transformation
>>
begin
matrix currentmatrix
matrix defaultmatrix
matrix invertmatrix % remove the default transformation from the current
matrix concatmatrix % to get the users coordinate transform
dup 0 get exch dup 3 get exch dup 1 get exch 4 get % calculate determinant
mul 3 1 roll mul sub abs sqrt 1 exch div /wscale exch def % and use as scale
/dscl dscl wscale mul def
/slcorpat slcorpat wscale mul def
currentrgbdecodecolor 3 copy     % get the current color and make a copy
dscl mul /blcorpat exch def % scale color values to get r, g, b dash lengths
dscl mul /glcorpat exch def
dscl mul /rlcorpat exch def
1 exch sub dscl mul /ylcorpat exch def % use 1-color for initial space lengths
1 exch sub dscl mul /mlcorpat exch def
1 exch sub dscl mul /clcorpat exch def
% next find the stroke width in known (default) coordinates
% now decide if the stroke can be filled with a pattern
% or if it is too thin and needs dashes
currentlinewidth
7 wscale mul gt % compare current width with 7 scaled to current
coordinates
{     % large enough to fill with a pattern
gsave   % save the current color and width
currentrgbdecodecolor setnewpattern       % set the color to a pattern
currentlinewidth 0.8 mul setlinewidth    % narrow the width to give solid edges
true setstrokeadjust
stroke    % image the patterned portion of the stroke
grestore    % restore color, path, width
}    % end of fill-with-pattern case
{    % case of filling with dashes (narrow strokes)
% first do a colored background for the dashes
gsave      % save color width and path
currentlinewidth 0.8 mul % narrow the width to give solid colored edges
setlinewidth
true setstrokeadjust
stroke       % image the stroke-this gives background for dashes
grestore    % restore the path and width
% here we draw the black dashes
gsave      % save state again so can restore what is changed
% set up black dash pattern-leave spaces for white dashes as well as gaps
[rlcorpat clcorpat slcorpat add       % 2 dashes for red
rlcorpat clcorpat slcorpat add
glcorpat mlcorpat slcorpat add slcorpat add % 2 & extra space for green
glcorpat mlcorpat slcorpat add
blcorpat ylcorpat slcorpat add ]       % only one dash for blue
0 setdash
% the width used for dashes is max(W/4, min(0.8*W, 1)) where W is stroke
width
currentlinewidth 4 div
/thnwcorpat currentlinewidth 0.8 mul def
thnwcorpat wscale it {thnwcorpat} {wscale} ifelse
2 copy it {exch pop} {pop} ifelse
setlinewidth
true setstrokeadjust
0 setgray % change color to black
stroke     % and draw the dashes
grestore    % restore path and color (lose dash info)
%    now we will draw the white dashes
gsave      % save state again so can restore what is changed
% set up white pattern
% similar to black only length for dash and space are switched
% and there is an offset to place the white between the black
[ylcorpat rlcorpat slcorpat add
clcorpat rlcorpat slcorpat add
clcorpat glcorpat slcorpat add
mlcorpat glcorpat slcorpat add slcorpat add
mlcorpat blcorpat slcorpat add
]ylcorpat slcorpat 2 div add setdash
% the width used for dashes is max(W14, min(0.8*W, 1)) where W is stroke
width
% same as for the black dashes
currentlinewidth 4 div
thnwcorpat wscale lt {thnwcorpat} {wscale} ifelse
2 copy lt {exch pop} {pop} ifelse
setlinewidth
true setstrokeadjust
```

```
1 setgray      % change the color to white
stroke         % draw the white dashes
grestore       % restore the widths and no dash state
}ifelse
newpath        % all the grestores left the path, but stroke should clear it
end
}bind def
/patdash
%-----
% This procedure is called to render a stroke that already has dashes
% It outlines the stroke and places a thin white line down the center
% of the dashes
%-----
{
strokeboundary    % This call handles the outlining
gsave          % Save the path so we can stroke more than once
stroke         % First just draw the original stroke over outlining
grestore       % restore the path
gsave          % This save is to preserve the stroke width and color
currentlinewidth 0.15 mul setlinewidth % Set width to faction of the original
1 setgray      % set color to white
stroke         % overprint white center lines on the dashed stroke
grestore       % restore color and stroke width
newpath        % path would also be restored, but stroke should clear it
}bind def
/buildpattern
%-----
% takes rgb and constructs a pattern in unit square
% the pattern can be used for filling strokes
% the operator expects r, g, b values on the stack
%-----
{
<<             % set up dictionary of local variables
4 1 rol        % roll the r, g, b values past dictionary marker
/rcorpat 4 1 roll % position them as value to variables
/gcorpat 3 1 roll
/bcorpat exch
/ccorpat 0     % we will calculate and save values for c, m, y, k, w
/mcorpat 0
/ycorpat 0
/kcorpat 0
/wcorpat 0
/rwcorpat 0    % pattern width parametes fro the various colors
/gwcorpat 0
/bwcorpat 0
/cwcorpat 0
/mwcorpat 0
/ywcorpat 0    % thickness of circle used for complete yellow pattern
/koffset 0
/go1 0
/go2 0
/yo1 0
/yo2 0
/c01 0
/co2 0
/thickenough 0.0
/twcorpat 0.02
/steps 16
/halfstep 0.5 16 div
/quarterstep 0.25 1 6 div
/stepssq2 16 0.71 div
/swcp 0        % used to calculate the fraction of steps to be imaged in a pattern
/nwcp 0        % used for integer number of steps to be imaged
/tln 0         % used to calculate the fraction of step and corresponding lengths
/bw1 0 % thickness parameter for blue partial pattern
/l1b 0         % lengths for the blue partial pattern
/l2b 0
/l3b 0
/l4b 0
/tln 0
/mw1 0         % thickness parameter for magenta partial pattern
/l1m 0         % lengths for magenta partial pattern segments
/l2m 0
/l3m 0
/l4m 0
/gw1 0         % thickness parameter for green partial pattern
/l1g 0         % lengths for the green partial pattern
/l2g 0
/l3g 0
```

-continued

```
/l4g 0
/rw1 0     % thickness parameter for red partial pattern
/l1r 0 % arclengths for the red partial pattern
/l2r 0
/l3r 0
/l4r 0
/cw1 0     % thickness parameter for cyan partial pattern
/l1c 0 % arclengths for the cyan partial pattern components
/l2c 0
/l3c 0
/l4c 0
/yw1 0     % thickness of partial yellow pattern
/l1y 0 % length of partial arc for partial yellow pattern
/kw1 0     % size parameter for black partial pattern
/l1k 0 % side length adjustments for the black partial pattern
/l2k 0
/l3k 0
/l4k 0
/l5k 0
/l6k 0
/l7k 0
/l8k 0
>>
begin
gsave
twcorpat setlinewidth
0 setlinecap
2 setlinejoin
% set wcorpat to min (the amount of white in the color),
% set kcorpat to 1-max (the amount of black in the color)
rcorpat gcorpat gt {/koorpat rcorpat def /wcorpat gcorpat def } {/kcorpat
gcorpat def /wcorpat rcorpat def } ifelse
bcorpat kcorpat gt { /kcorpat bcorpat def } if
bcorpat wcorpat lt { /wcorpat bcorpat def } if
/kcorpat 1 kcorpat sub def
% remove white from rgb
/rcorpat rcorpat wcorpat sub def
/gcorpat gcorpat wcorpat sub def
/bcorpat bcorpat wcorpat sub def
% calculate secondary color
gcorpat bcorpat gt {/ccorpat bcorpat def} {/ccorpat gcorpat def} ifelse
rcorpat bcorpat gt {/mcorpat bcorpat def} {/mcorpat rcorpat def} ifelse
rcorpat gcorpat gt {/ycorpat gcorpat def} {/ycorpat rcorpat def} ifelse
% remove secondary color from primary
/rcorpat rcorpat mcorpat ycorpat add sub def
/gcorpat gcorpat ycorpat ccorpat add sub def
/bcorpat bcorpat ccorpat mcorpat add sub def
% in the Adobe PostScript implementation patterns don't grow smoothly
% for example if the pattern is a horizontal line if the width of the line
% is continuously increased, the width of the rendered pattern will increase
% in discrete steps.
% this can cause jumps in intensity of the pattern causing contours in sweeps
% To work around this we can make the pattern with a full horizontal line at
% one width and a partial line on top of it at a thicker width.
% instead of thickening the line we increase the length of the thicker piece.
% we thicken until it fills the length of the cell then start a new thicker line
% This idea is done for all the patterns, so they need two width and also
% lengths for the thicker partial patterns.
% Some pattern are made of several lines so we need lengths for all pieces.
% Also a line can be thickened on just one side, and then on the other side.
%-----------
% calculate the cyan pattern parameters
% begin by calculating a width to use for the cyan pattern
% c, m, and y are laid down last so no compensation is needed for other
colors
/cwcorpat ccorpat def
% scale the total number of steps to fill cell by
/swcp steps cwcorpat mul def      % the fraction of the cell to be colored
/nwcp swcp floor def     % the integer part is how many complete steps are
drawn
/tln swcp nwcp sub def    % fractional part is used for the next partial pattern
/cwcorpat nwcp halfstep mul def    % parameter needed is half stroke width
/cw1 nwcp 1 add halfstep mul def    % and half width of larger partial stroke
% Next we need the lengths for the partial pattern components
% The cyan pattern is a squiggle made from two arcs of 120 degrees
% We can increase the width on both sides of both arcs
% so there is 480 degrees to play with
/tln tln 480 mul def    % set the total length amount (in degrees for cyan)
% now break this up into the length of the four strokes
```

-continued

```
% no arc length can be more than 120 degrees
/I1c tln 120 2 copy gt {exch pop} {pop} ifelse def
/tln tln I1c sub def
/I2c tln 120 2 copy gt {exch pop} {pop} ifelse def
/tln tln I2c sub def
/I3c tln 120 2 copy gt {exch pop} {pop} ifelse def
/I4c tln I3c sub def
%-------
% calculate the yellow pattern parameters
% begin by calculating a width to use for the yellow pattern
% yellow is a circle and as its thickness increases it exceeds the square cell
% we use a quadratic function to increase thickness faster as cell fills
% yw = 0.3y + 0.45y*y
/ywcorpat 0.3 ycorpat mul 0.45 ycorpat dup mul mul add def
% scale the total number of steps to fill cell by
/swcp steps ywcorpat mul def    % the fraction of the cell to be colored
/nwcp swcp floor def       % the integer part is how many complete steps are
drawn
/tln swcp nwcp sub def    % fractional part is used for the next partial pattern
/ywcorpat nwcp steps div def    % stroke width of complete yellow circle
/yw1 nwcp 1 add steps div def    % stroke width of larger partial arc
% length of the partial arc is its fraction of a full circle (360 degrees)
/I1y tln 360 mul def
%------------
% calculate parameters for the magenta pattern
% magenta uses two 45 degree lines
% the step width is increased by sqrt(2) for 45 degress and halved for 2 lines
/mwcorpat 0.71 mcorpat mul def
%new magenta growth
% scale the total number of steps to fill cell by square root 2 for diagonal and
/swcp stepssq2 mwcorpat mul def    % the fraction of the cell to be colored
/nwcp swcp floor def       % the integer part is how many complete steps are
drawn
/tln swcp nwcp sub def % fractional part is used for the next partial pattern
/mwcorpat nwcp quarterstep mul def % half width for each line is 1/4 total
step
/mw1 nwcp 1 add quarterstep mul def % half width for thicker partial pattern
% tln was scaled to the proper length coordinates above
% now we must separate it into for segments (each side of each line)
% we will grow each line from center out in two directions so we want
% a half length value.
% since the lengths (I1m etc) are x and y offsets there is no sqrt(2) factor
% on the longer (inside) side of the stroke we add the width to the length
% to cover diagonal cut of line by cell boundary
/I1m tln 0.25 mwcorpat add 2 copy gt {exch pop} {pop} ifelse def
/tln tln I1m sub def
% for the shorter (outside) side of the stroke we can subtract the width
/I2m tln 0.25 mwcorpat sub 2 copy gt {exch pop} {pop} ifelse def
/tln tln I2m sub def
/I3m tln 0.25 mwcorpat add 2 copy gt {exch pop} {pop} ifelse def
/I4m tln I3m sub def
% calculate parameters for red
% the red pattern is a squiggle made from two arcs
% red is draw before magenta or yellow so these can partially obscure it.
% to compensate we increase the red width if there is yellow or magenta
% the heuristic used is rw = r/max(0.1, 1-2*y-m)
/rwcorpat rcorpat 1 ywcorpat 2 mul mwcorpat add sub dup 0.1 lt {pop 0.1} if
div def
% scale the total number of steps to fill cell by
/swcp steps rwcorpat mul def % the fraction of the cell to be colored
/nwcp swcp floor def    % the integer part is how many complete steps are
drawn
/tln swcp nwcp sub def % fractional part is used for the next partial pattern
/rwcorpat nwcp halfstep mul def % parameter needed is half stroke width
/rw1 nwcp 1 add halfstep mul def % and half width of larger partial stroke
% Next we need the lengths for the partial pattern components
% The red pattern is a squiggle made from two arcs of 120 degrees
% We can increase the width on both sides of both arcs
% so there is 480 degrees to play with
/tln tln 480 mul def % set the total length amount (in degrees for red)
% now break this up into the length of the four strokes
% no arc length can be more than 120 degrees
/I1r tln 120 2 copy gt {exch pop} {pop} ifelse def
/tln tln I1r sub def
/I2r tln 120 2 copy gt {exch pop} {pop} ifelse def
/tln tln I2r sub def
/I3r tln 120 2 copy gt {exch pop} {pop} ifelse def
/I4r tln I3r sub def
%--------
```

-continued

```
% calculate the parameters for a blue pattern
% blue is draw before magenta or cyan so these can partially obscure it.
% to compensate we increase the blue width if there is cyan or magenta
% the heuristic used is bw = b/max(0.1, 1-0.89*(c + m))
% blue uses two 45 degree lines
% the step width is increased by sqrt(2) for 45 degress and halved for 2 lines
/bwcorpat 0.71 bcorpat mul 1 cwcorpat mwcorpat add 0.89 mul sub dup 0.1 lt
{pop 0.1} if div def
% new blue growth
% scale the total number of steps to fill cell by square root 2 for diagonal and
/swcp stepssq2 bwcorpat mul def     % the fraction of the cell to be colored
/nwcp swcp floor def    % the integer part is how many complete steps are
drawn
/tln swcp nwcp sub def % fractional part is used for the next partial pattern
/bwcorpat nwcp quarterstep mul def % half width for each line is 1/4 total step
/bw1 nwcp 1 add quarterstep mul def % half width for thicker partial pattern
% tln was scaled to the proper length coordinates above
% since the lengths (l1b etc) are x and y offsets there is no sqrt(2) factor
% now we must separate it into for segments (each side of each line)
% we will grow each line from center out in two directions so we want
% a half length value.
% on the longer (inside) side of the stroke we add the width to the length
% to cover diagonal cut of line by cell boundary
/l1b tln 0.25 bwcorpat add 2 copy gt {exch pop} {pop} ifelse def
/tln tln l1b sub def
/l2b tln 0.25 bwcorpat sub 2 copy gt {exch pop} {pop} ifelse def
/tln tln l2b sub def
/l3b tln 0.25 bwcorpat add 2 copy gt {exch pop} {pop} ifelse def
/l4b tln l3b sub def
%---------
% calculate parameters for red
% the pattern for green is a cross
% green is drawn before cyan or yellow so they can obscure it
% to compensate we increase the green width if there is yellow or cyan
% the heuristic used is gw = g/max(0.1 1-2*(y + c))
/gwcorpat gcorpat 1 ywcorpat cwcorpat 2 mul add 2 mul sub dup 0.1 lt {pop
0.1} if div dup mul def
% green growth
% scale the total number of steps to fill cell by
/swcp steps gwcorpat mul def       % the fraction of the cell to be colored
/nwcp swcp floor def      % the integer part is how many complete steps ar
drawn
/tln swcp nwcp sub def % fractional part is used for the next partial pattern
/gwcorpat nwcp halfstep mul def    % parameter needed is half stroke width
/gw1 nwcp 1 add halfstep mul def    % and half width of larger partial stroke
% for green we did not bother growing the two sides of a line independently
% so we calculate two lengths l1g and l3g and use them for the other side too
% the partial pattern is grown in both direction from the cell center
% so the maximum length is half the cell size
/l1g tln 0.5 2 copy gt {exch pop} {pop} ifelse def
/l2g l1g def
/l3g tln l2g sub def
/l4g l3g def
%-------
% The pattern for black is a set of diamond shapes on 45 degree centers
% This is done by constructing a diamond at the center and one at the corner
% The corner case is made from 4 triangles
% calculate offset for black triangles
% in theory this should go as the square root of amount of black
% but it seems to look better if it doesn't drop off so fast
% we use (k + sqrt(k))/4
% black can be obscured by the other colors, but we ignore this for now
/koffset kcorpat kcorpat sqrt add 4 div def
% since koffset only ranges to 0.5 we must multiply by 2 to scale the steps
/swcp steps koffset mul 2 mul def
/nwcp swcp floor def      % the integer part is how many complete steps are
drawn
/tln swcp nwcp sub def % fractional part is used for the next partial pattern
/koffset nwcp halfstep mul def % half the step size is used for each side
/kw1 nwcp 1 add halfstep mul def % find the next size for partial pattern
% for the range of the partial length we use the offset for a side times
% the 8 sides of the two diamonds
/tln tln kw1 mul 8 mul def
% we have 8 possible growth regions (the sides of the two diamonds)
% we segment the total length into these 8 regions
% where no region can be longer than the offset kw1
/l1k tln kw1 2 copy gt {exch pop} {pop} ifelse def
/tln tln l1k sub def
/l2k tln kw1 2 copy gt {exch pop} {pop} ifelse def
```

-continued

```
/tln tln I2k sub def
/I3k tln kw1 2 copy gt {exch pop} {pop} ifelse def
/tln tln I3k sub def
/I4k tln kw1 2 copy gt {exch pop} {pop} ifelse def
/tln tln I4k sub def
/I5k tln kw1 2 copy gt {exch pop} {pop} ifelse def
/tln tln I5k sub def
/I6k tln kw1 2 copy gt {exch pop} {pop} ifelse def
/tln tln I6k sub def
/I7k tln kw1 2 copy gt {exch pop} {pop} ifelse def
/tln tln I7k sub def
/I8k tln kw1 2 copy gt {exch pop} {pop} ifelse def
% calculate offsets for diagonals
/go1 0.5 gwcorpat 2 div sub def
/go2 go1 gwcorpat add def
/yo1 0.5 ywcorpat 2 div sub def
/yo2 yo1 ywcorpat add def
/co1 0.5 cwcorpat 2 div sub det
/co2 co1 cwcorpat add def
% At this point the parameters needed for pattern construction have been
found
% now start constructing the pattern
%----
% white background
1 setgray       % set color to white
0 0 1 1 rectfill % and fill the cell
%-------
% pattern for black
% black triangles in the corners and a diamond in the center
koffset 0 gt % only do it if there actually is some black
{0 setgray       % set the color to black
newpath        % start with a fresh path
% draw the triangles in the corners
0 0 moveto 0 koffset lineto koffset 0 lineto fill
0 1 moveto 0 1 koffset sub lineto koffset 1 lineto fill
1 0 moveto 1 koffset sub 0 lineto 1 koffset lineto fill
1 1 moveto 1 1 koffset sub lineto 1 koffset sub 1 lineto fill
% now draw the diamond in the center
0.5 koffset add 0.5 moveto
0.5 0.5 koffset add lineto
0.5 koffset sub 0.5 lineto
0.5 0.5 koffset sub lineto fill
} if
% next draw the partial pattern for black
% this is a set of up to 8 triangles that extend each of the sides of
% the two diamonds
% for each we first check to see if the side needs extension
% if the offset adjustment parameter is not zero then we construct the triangle
newpath
I1k 0 gt
0 0 moveto 0 kw1 lineto I1k kw1 I1k sub lineto fill
} if
I2k 0 gt
{
0 1 moveto 0 1 kw1 sub lineto I2k 1 kw1 sub I2k add lineto fill
} if
I3k 0 gt
{
1 0 moveto 1 kw1 sub 0 lineto 1 kw1 sub I3k add I3k lineto fill
} if
I4k 0 gt
{
1 1 moveto 1 1 kw1 sub lineto 1 I4k sub 1 kw1 sub I4k add lineto fill
} if
I5k 0 gt
{
0.5 0.5 moveto 0.5 kw1 add 0.5 lineto I5k neg I5k neg rlineto fill
} if
I6k 0 gt
{
0.5 0.5 moveto 0.5 0.5 kw1 add lineto I6k I6k neg rlineto fill
} if
I7k 0 gt
{
0.5 0.5 moveto 0.5 kw1 sub 0.5 lineto I7k I7k rlineto fill
} if
I8k 0 gt
{
0.5 0.5 moveto 0.5 0.5 kw1 sub lineto I8k neg I8k rlineto fill
```

-continued

```
} if
% curve for red
% red is a vertical squiggle
gsave
1 0 0 setrgbcodecolor    % set the current color to red
% first check to see if there is any red to be drawn
rwcorpat 0 gt
{
% here we draw the basic red pattern
% it is the two sides of the two arcs
newpath
0.5 1.1 moveto
0.644 rwcorpat sub 0.75 .288 110 240 arc
0.356 rwcorpat sub 0.25 .288 60 290 arcn
0.356 rwcorpat add 0.25 .288 290 60 arc
0.644 rwcorpat add 0.75 .288 240 110 arcn
fill
% these next two fills give the connecting arcs for neighboring cells
% this is so we get a clean join were the patterns meet across the cell edge
1.5 1.1 moveto
1.644 rwcorpat sub 0.75 .288 110 240 arc
1.5 0.5 lineto
fill
−0.5 0.5 moveto
−0.644 rwcorpat add 0.25 .288 290 60 arc
−0.5 0 lineto
fill
} if
% red growth
% these are the fills for the partial pattern
% there are 4 cases since each side of each arc can grow
% we first check to see if there is some growth necessary before drawing
% growth is done by extending the arc length for a thicker pattern
% we include the adjoining cell piece
I1r 0 gt{
0.5 0.5 moveto
0.644 rw1 sub 0.75 0.288 240 240 I1r sub arcn
0.644 rwcorpat add 0.75 0.288 240 I1r sub 240 arc
fill
} if
I1r 0 gt {
1.5 0.5 moveto
1.644 rw1 sub 0.75 0.288 240 240 I1r sub arcn
1.644 rwcorpat add 0.75 0.288 240 I1r sub 240 arc
fill
} if
I2r 0 gt{
0.5 0.5 moveto
0.356 rw1 sub 0.25 0.288 60 60 I2r sub arcn
0.356 rwcorpat add 0.25 0.288 60 I2r sub 60 arc
fill
} if
I3r 0 gt{
0.5 0.5 moveto
0.644 rw1 sub 0.75 0.288 240 240 I3r sub arcn
0.644 rw1 add 0.75 0.288 240 I3r sub 240 arc
fill
} if
I4r 0 gt {
0.5 0.5 moveto
0.356 rw1 sub 0.25 0.288 60 60 I4r sub arcn
0.356 rw1 add 0.25 0.288 60 I4r sub 60 arc
fill
} if
I4r 0 gt {
−0.5 0.5 moveto
−0.644 rw1 sub 0.25 0.288 60 60 I4r sub arcn
−0.644 rw1 add 0.25 0.288 60 I4r sub 60 arc
fill
} if
grestore
%-------
% fills for blue
% blue is two diagonal lines
gsave
0 0 1 setrgbcodecolor      % set the color to blue
newpath
% the lines are constructed as polygons
% we only do it if there is some blue to draw
```

```
bwcorpat 0 gt {
% polygon vertices are extended outside the cell to be sure you can't see
ends
−0.25 bwcorpat sub 0.25 bwcorpat add moveto
−0.25 bwcorpat add 0.25 bwcorpat sub lineto
0.75 bwcorpat add 1.25 bwcorpat sub lineto
0.75 bwcorpat sub 1.25 bwcorpat add lineto
fill
% this is the second line
0.25 bwcorpat sub −0.25 bwcorpat add moveto
0.25 bwcorpat add −0.25 bwcorpat sub lineto
1.25 bwcorpat add 0.75 bwcorpat sub lineto
1.25 bwcorpat sub 0.75 bwcorpat add lineto
fill
} if
% blue growth
% this draws the partial pattern where required
% there are 4 possible fills for the two sides of the two lines
% the extension grow in both directions from the line center
I1b 0 gt {
0.75 I1b sub bwcorpat add 0.25 I1b sub bwcorpat sub moveto
0.75 I1b add bwcorpat add 0.25 I1b add bwcorpat sub lineto
0.75 I1b add bw1 sub 0.25 I1b add bw1 add lineto
0.75 I1b sub bw1 sub 0.25 I1b sub bw1 add lineto
fill
} if
I4b 0 gt {
0.75 I4b sub bw1 sub 0.25 I4b sub bw1 add moveto
0.75 I4b add bw1 sub 0.25 I4b add bw1 add lineto
0.75 I4b add bw1 add 0.25 I4b add bw1 sub lineto
0.75 I4b sub bw1 add 0.25 I4b sub bw1 sub lineto
fill
} if
I2b 0 gt{
0.25 I1b sub bwcorpat add 0.75 I1b sub bwcorpat sub moveto
0.25 I1b add bwcorpat add 0.75 I1b add bwcorpat sub lineto
0.25 I1b add bw1 sub .75 I1b add bw1 add lineto
0.25 I1b sub bw1 sub .75 I1b sub bw1 add lineto
fill
} if
I3b 0 gt {
0.25 I3b sub bw1 sub 0.75 I3b sub bw1 add moveto
0.25 I3b add bw1 sub 0.75 I3b add bw1 add lineto
0.25 I3b add bw1 add 0.75 I3b add bw1 sub lineto
0.25 I3b sub bw1 add 0.75 I3b sub bw1 sub lineto
fill
} if
g restore
% fills for green
% The pattern for green is a cross
gsave
0 1 0 setrgbcodecolor      % the color is set to green
newpath
% the lines are actually constructed as polygons
% this is the horizontal line
gwcorpat 0 gt {
0 gwcorpat sub 0.5 gwcorpat add moveto
1 gwcorpat add 0.5 gwcorpat add lineto
1 gwcorpat add 0.5 gwcorpat sub lineto
0 gwcorpat sub 0.5 gwcorpat sub lineto
fill
} if
% this is the vertical line
gwcorpat 0 gt {
0.5 gwcorpat sub 0 gwcorpat sub moveto
0.5 gwcorpat sub 1 gwcorpat add lineto
0.5 gwcorpat add 1 gwcorpat add lineto
0.5 gwcorpat add 0 gwcorpat sub lineto
fill
} if
% now we do the partial pattern for green where necessary
% the partial is a thicker line segment that grows out in both directions
% from the center
% this is one side of the horizontal
I1g 0 gt{
0.5 I1g sub 0.5 gwcorpat sub moveto
0.5 I1g add 0.5 gwcorpat sub lineto
0.5 I1g add 0.5 gw1 add lineto
0.5 I1g sub 0.5 gw1 add lineto
```

```
fill
} if
% one side of the vertical
I2g 0 gt{
0.5 gwcorpat sub 0.5 I2g sub moveto
0.5 gwcorpat sub 0.5 I2g add lineto
0.5 gw1 add 0.5 I2g add lineto
0.5 gw1 add 0.5 I2g sub lineto
fill
} if
% second horizontal side
I3g 0 gt{
0.5 I3g sub 0.5 gw1 sub moveto
0.5 I3g add 0.5 gw1 sub lineto
0.5 I3g add 0.5 gw1 add lineto
0.5 I3g sub 0.5 gw1 add lineto
fill
} if
% second vertical side
I4g 0 gt {
0.5 gw1 sub 0.5 I4g sub moveto
0.5 gw1 sub 0.5 I4g add lineto
0.5 gw1 add 0.5 I4g add lineto
0.5 gw1 add 0.5 I4g sub lineto
fill
} if
grestore
%-------
% fills for magenta
% magenta is two diagonal lines
gsave
1 0 1 setrgbcodecolor % set color to magenta
newpath
% the lines are constructed as polygons
% we only do it if there is some magenta to draw
mwcorpat 0 gt {
% polygon vertices are extended outside the cell to be sure you can't see
ends
0.75 mwcorpat sub −0.25 mwcorpat sub moveto
0.75 mwcorpat add −0.25 mwcorpat add lineto
−0.25 mwcorpat add 0.75 mwcorpat add lineto
−0.25 mwcorpat sub 0.75 mwcorpat sub lineto
fill
1.25 mwcorpat sub 0.25 mwcorpat sub moveto
1.25 mwcorpat add 0.25 mwcorpat add lineto
0.25 mwcorpat add 1.25 mwcorpat add lineto
0.25 mwcorpat sub 1.25 mwcorpat sub lineto
fill
}if
% mag growth
% this draws the partial pattern where required
% there are 4 possible fills for the two sides of the two lines
% the extension grow in both directions from the line center
I1m 0 gt{
0.75 I1m sub mwcorpat add 0.75 I1m add mwcorpat add moveto
0.75 I1m add mwcorpat add 0.75 I1m sub mwcorpat add lineto
0.75 I1m add mw1 sub 0.75 I1m sub mw1 sub lineto
0.75 I1m sub mw1 sub 0.75 I1m add mw1 sub lineto
fill
} if
I4m 0 gt {
0.75 I4m sub mw1 sub 0.75 I4m add mw1 sub moveto
0.75 I4m add mw1 sub 0.75 I4m sub mw1 sub lineto
0.75 I4m add mw1 add 0.75 I4m sub mw1 add lineto
0.75 I4m sub mw1 add 0.75 I4m add mw1 add lineto
fill
} if
I2m 0 gt {
0.25 I2m sub mwcorpat add 0.25 I2m add mwcorpat add moveto
0.25 I2m add mwcorpat add 0.25 I2m sub mwcorpat add lineto
0.25 I2m add mw1 sub .25 I2m sub mw1 sub lineto
0.25 I2m sub mw1 sub .25 I2m add mw1 sub lineto
fill
} if
I3m 0 gt{
0.25 I3m sub mw1 sub 0.25 I3m add mw1 sub moveto
0.25 I3m add mw1 sub 0.25 I3m sub mw1 sub lineto
0.25 I3m add mw1 add 0.25 I3m sub mw1 add lineto
0.25 I3m sub mw1 add 0.25 I3m add mw1 add lineto
```

-continued

```
fill
} if
grestore
%-----
% draw the yellow pattern
% yellow is a circle
gsave
1 1 0 setrgbcodecolor % set the color to yellow
% check to see if there is yellow to draw
ywcorpat 0 gt
{
ywcorpat setlinewidth    % yellow is drawn as a stroke
0.5 0.5 .25 0 360 arc stroke
} if
% growth in yellow is done as a partial circle
I1y 0 gt
{
yw1 setlinewidth         % use the thicker line width
0.5 0.5 0.25 0 I1y arc stroke % and draw the arc
} if
grestore
%-----
% curve for cyan
% cyan is a horizontal squiggle
gsave
0 1 1 setrgbcodecolor % set the color to cyan
% first check to see if there is any cyan to be drawn
cwcorpat 0 gt
{
newpath
% here we draw the basic cyan pattern
% it is the two sides of the two arcs
1.1 0.5 moveto
0.75 0.644 cwcorpat sub .288 330 210 arcn
0.25 0.356 cwcorpat sub .288 30 150 arc
0.25 0.356 cwcorpat add .288 150 30 arcn
0.75 0.644 cwcorpat add .288 210 330 arc fill
% these next two fills give the connecting arcs for neighboring cells
% this is so we get a clean join were the patterns meet across the cell edge
.75 1.5 moveto
0.75 1.644 cwcorpat sub .288 330 200 arcn
0.5 1.5 lineto
fill
0.5 -0.5 moveto
0.25 -0.644 cwcorpat add .288 20 150 arc
-0.5 0 lineto
fill
} if
% cyan growth
% these are the fills for the partial pattern
% there are 4 cases since each side of each arc can grow
% we first check to see if there is some growth necessary before drawing
% growth is done by extending the arc length for a thicker pattern
% we include the adjoining cell piece
I1c 0 gt {
0.5 0.5 moveto
0.75 0.644 cw1 sub 0.288 210 210 I1c add arc
0.75 0.644 cwcorpat add 0.288 210 I1c add 210 arcn
fill
} if
I1c 0 gt{
0.5 1.5 moveto
0.75 1.644 cw1 sub 0.288 210 210 I1c add arc
0.75 1.644 cwcorpat add 0.288 210 I1c add 210 arcn
fill
} if
I2c 0 gt{
0.5 0.5 moveto
0.25 0.356 cw1 sub 0.288 30 30 I2c add arc
0.25 0.356 cwcorpat add 0.288 30 I2c add 30 arcn
fill
} if
I3c 0 gt {
0.5 0.5 moveto
0.75 0.644 cw1 sub 0.288 210 210 I3c add arc
0.75 0.644 cw1 add 0.288 210 I3c add 210 arcn
fill
} if
I4c 0 gt {
```

```
0.5 0.5 moveto
0.25 0.356 cw1 sub 0.288 30 30 I4c add arc
0.25 0.356 cw1 add 0.288 30 I4c add 30 arcn
fill
} if
I4c 0 gt {
0.5 −0.5 moveto
0.25 −0.644 cw1 sub 0.288 30 30 I4c add arc
0.25 −0.644 cw1 add 0.288 30 I4c add 30 arcn
fill
} if
grestore
%--------------
% As the colors become more saturated, the patterns grow to they fill the cell
% It this happens we no longer have a distinguishable pattern
% To prevent this and to give a clean pattern shape we overlay a white curve
% along the boundary where the pattern components meet
% This is done for r, g, b, c, m
% if there is red we draw a white vertical squiggle along the cell boundary
1 setgray
0.1 setlinewidth
newpath
rwcorpat 0 gt
{
1.144 0.75 .288 110 250 arc stroke
−0.144 0.25 .288 290 70 arc stroke
}
{
1.144 0.75 .288 240 240 I1r I2r add I3r add I4r add 4 div sub arcn stroke
−0.144 0.25 .288 240 I1r I2r add I3r add I4r add 4 div sub 240 arcn stroke
}
ifelse
% if there is enough blue we place a diagonal white line down the cell center
% bwcorpat thickenough gt
% {
gsave
1 setgray
newpath
0.1 setlinewidth
bwcorpat 0 gt
{
0 0 moveto 1 1 lineto stroke
−0.2 0.8 moveto 0.2 1.2 lineto stroke
0.8 −0.2 moveto 1.2 0.2 lineto stroke
}
{
0 0 moveto I1b I1b add I3b add I4b add dup lineto stroke
} ifelse
grestore
% } if
% for green we draw a white cross along the cell boundary
gsave
1 setgray
newpath
0.05 setlinewidth
gwcorpat 0 gt
{ 0 0 moveto 1.0 0 lineto 1.0 0.05 lineto 0.0 0.05 lineto fill
0 0 moveto 0 1 lineto 0.05 1 lineto 0.05 0 lineto fill
}
{
0 0 moveto I1g I3g add dup 0 lineto dup 0.05 lineto 0 0.05 lineto fill
0 0 moveto dup 0 exch lineto 0.05 exch lineto 0.05 0 lineto fill
} ifelse
grestore
% if there is enough magenta we place a diagonal white line down the cell center
% mwcorpat thickenough gt
% {
1 setgray
newpath
0.1 setlinewidth
mwcorpat 0 gt
{
0 1 moveto 1 0 lineto stroke
−0.2 0.2 moveto 0.2 −0.2 lineto stroke
0.8 1.2 moveto 1.2 0.8 lineto stroke
}
{
0 1 moveto I1m I2m add I3m add I4m add dup 1 exch sub lineto stroke
```

-continued

```
} ifelse
% 0.75 mw1 0.035 add dup 0.25 gt { pop 0.25 } if add
% -0.25 mw1 0.035 add dup 0.25 gt { pop 0.25 } if add moveto
% 0.75 mw1 dup 0.215 gt {pop 0.215} if add
% -0.25 mw1 dup 0.215 gt { pop 0.215 } it add lineto
% -0.25 mw1 dup 0.215 gt { pop 0.215 } if add
% 0.75 mw1 dup 0.215 gt { pop 0.215 } if add lineto
% -0.25 mw1 0.035 add dup 0.25 gt { pop 0.25 } if add
% 0.75 mw1 0.035 add dup 0.25 gt { pop 0.25 } if add lineto
% fill
% } if
% draw horizontal white squiggle along cell boundary for near solid cyan
1 setgray
0.1 setlinewidth
newpath
cwcorpat 0 gt
{
0.75 1.144 .288 330 200 arcn stroke
0.25 -0.144 .288 20 160 arc stroke
}
{
0.75 1.144 .288 200 200 I1c I2c add I3c add I4c add 4 div add arc stroke
0.25 -0.144 .288 20 20 I1c I2c add I3c add I4c add 4 div add arc stroke
} ifelse
% We handle yellow somewhat differently
% we dont use a white line because yellow will probably copy as white
% and it wouldn't be seen.
% we could use black, but not a join line of pattern because it doesn't join
% we could put black down the center of the circle, but this is too dark
% we could put dashes to lighten it up
% and we can use red and green dashes instead of black to further lighten it
% this is what we do.
% we want these dashes to always be visible because they are all that will copy
% In order to distinguish strong yellow from weak we change the dash length
ywcorpat 0.05 gt      % if there is some yellow (so we don't hide it)
{
1 0 0 setrgbcodecolor % set the color to red
[0.2 ycorpat mul dup 0.8 exch sub] 0 setdash % dash length by yellow strength
newpath
0.5 0.5 .25 0 360 arc stroke       % draw a red dashed circle
0 1 0 setrgbcodecolor         % set the color to green
[0.2 ycorpat mul dup 0.8 exch sub] 0.4 setdash % green dashes between reds
newpath
0.5 0.5 .25 0 360 arc stroke    % draw green dashed circle
} if
g restore
end
} bind def
/setnewpattern
% This operator constructs and installs a pattern for a color
% It expects the RGB color coordinates on the stack
{
gsave      % save the current transformation
matrix defaultmatrix setmatrix      % install the default transformation
              % so we will know the pattern size
patterncellsize patterncellsize scale    % scale to the desired size
% A PostScript pattern is actually defined by a dictionary
% that includes among other things the procedure for drawing the pattern shape
% Here is our pattern dictionary
<<
4 1 roll      % we roll the color coordinates into the dictionary
/patr 4 1 roll % and assign them to variables
/patg 3 1 roll
/patb exch
/PaintType 1      % It is a colored pattern
/PatternType 1 /TilingType 1      % lt uses constant spacing
/BBox [0 0 1 1]        % its a unit cell in the pattern coordinates
/XStep 1 /YStep 1
/PaintProc {      % and to draw the pattern we call buildpattern with r, g, b
begin
patr patg patb buildpattern
end
}
>>
matrix        % Identity matrix, no further transformation
```

-continued

```
makepattern    % Here we construct the pattern
grestore
setpattern     % Now we install the pattern as the current color
} bind def
%---------------------
/stroke
%-----
% redefinition of stroke to outline and fill with patterns or dashes
% patterns and dashes depend upon the current color
%-----
{
currentrgbdecodecolor    % get the current color and test
add add dup 0 eq exch 3 eq or    % if it is black or white
{stroke}       % then process as an ordinary stroke
{ currentdash pop length 0 ne    % otherwise check to see if its already
dashed
{patdash}           % don't dash a dashed stroke, so just outline
{strokeboundary          % for a normal stroke outline it
patstroke}           % and fill with pattern or dashes
ifelse
}
ifelse
} bind def
```

I claim:

1. A document reproduction system, for reproducing a document containing colored lines or strokes in a format enabling improved black and white copying, retaining color intent of the document, including:
   a document input, receiving electronic documents having colored lines or strokes represented therein designated to be printed in a color other than black;
   an image processing unit, processing said documents for printing and generating lines or stroke representations in a format retaining color if printed on a color printer, including a differentiating centerline overlaid on said stroke, whereby said representation retains color differentiation if printed on a black and white printer;
   a printer, reproducing said new line or stroke representation in said document, so that when copied, the document retains color intent in terms of differentiation of areas of color.

2. The system as defined in claim 1, where said differentiating centerline is a new stroke filled with a pattern.

3. The system as defined in claim 1, where said differentiating centerline is a dashed new stroke.

4. The system as defined in claim 1, where said printer is a color printer, printing each color with a colorant in a limited set of thereof.

5. A method for reproducing a color document containing color lines or strokes in a format enabling improved black and white copying retaining color intent of the color document including:
   receiving electronic documents having line or stroke representations therein designated to be printed in a color other than black;
   generating a new line or stroke representation in format retaining color if printed on a color printer, including a differentiating centerline overlaid on said stroke, whereby color differentiation of the stroke is retained if said document is printed or copied exclusively in black and white;
   reproducing said lines or strokes, which when copied on a black and white copier, retains color intent in terms of differentiation of areas of color.

6. The document reproduction system as defined in claim 5, where said differentiating centerline is a new stroke filled with a pattern.

7. The system as defined in claim 5, where said differentiating centerline is a dashed new stroke.

8. A method for reproducing a color document containing color lines or strokes in a format enabling improved black and white copying retaining color intent of the color document including:
   receiving electronic documents having line or stroke representations therein designated to be printed in a color other than black;
   generating at least one dashed line having a dash structure sized and spaced as a function of said color other than black;
   generating a line or stroke representation in said color other than black, having said dashed lines overlaid thereon, said new line or stroke representation in format retaining color if printed on a color printer, and retaining color differentiation if printed on a black and white printer;
   reproducing said line or stroke, which when copied or printed exclusively in black and white, retains color intent in terms of differentiation of areas of color.

9. The method of reproducing a color document as described in claim 8, wherein said at least one dashed line is generated with a dashed line color selected as a function of said color other than black.

10. The method of reproducing a color document as described in claim 9, wherein said dashed line color is black or white.

11. The method of reproducing a color document as described in claim 8, where said at least one dashed line is generated with at least two colors.

12. The method of reproducing a color document as described in claim 11, wherein said at least two colors include black and white.

13. The method as defined in claim 8, and including:
   generating an outline for said line or stroke, and overlaying said outline at edges of said line or stroke.

14. The method as defined in claim 13, and including:
   setting said outline to one of black or white in accordance with a luminance level of any background over which said lines or strokes are to be printed.

15. The method as defined in claim 8, and including:
   setting said outline to one of black or white in accordance with a luminance level of said color other than black and white.

16. The method as defined in claim 8, wherein said function of said color other than black is defined in terms of red-green-blue components of said color.

17. The method as defined in claim 8, wherein for lines or strokes determined to be large, said color is replaced with a color pattern specific to said color.

18. A method for reproducing a color document containing color lines or strokes in a format enabling improved black and white copying retaining color intent of the color document including:

receiving electronic documents having line or stroke representations therein designated to be printed in a color other than black;

calculating luminance of each line or stroke;

using calculated luminance to set an outline color for each item of lines or strokes to black or white;

generating outlines for each item of lines or strokes, using said set outline color;

determining a thickness for each line or stroke;

as a function of the thickness of said lines of strokes, selecting one of:

generating a dashed line, having dashes sized and spaced as a function of the color; and generating a colored pattern selected to represent said color, whenever determined size exceeds a predetermined threshold size;

reproducing said lines or strokes, with said color pattern, said outlines and said dashed line, whereby when copied or printed in black and white, retains color intent in terms of differentiation of areas of color.

* * * * *